United States Patent
Jones

(10) Patent No.: US 12,529,477 B2
(45) Date of Patent: Jan. 20, 2026

(54) SAFETY SYSTEM FOR GAS GRILL

(71) Applicant: Jason Baldwin Jones, Austin, TX (US)

(72) Inventor: Jason Baldwin Jones, Austin, TX (US)

(*) Notice: Subject to any disclaimer, the term of this patent is extended or adjusted under 35 U.S.C. 154(b) by 368 days.

(21) Appl. No.: 18/222,404

(22) Filed: Jul. 14, 2023

(65) Prior Publication Data

US 2024/0019127 A1    Jan. 18, 2024

Related U.S. Application Data

(60) Provisional application No. 63/389,819, filed on Jul. 15, 2022.

(51) Int. Cl.
*F24C 3/12* (2006.01)
*F23N 5/24* (2006.01)

(52) U.S. Cl.
CPC ............ *F24C 3/12* (2013.01); *F23N 5/242* (2013.01); *F23N 2225/06* (2020.01); *F23N 2225/16* (2020.01)

(58) Field of Classification Search
CPC .............................. F23N 5/242; F23N 2225/06
USPC .............. 431/181, 80, 255, 76, 69; 126/25 R
See application file for complete search history.

(56) References Cited

U.S. PATENT DOCUMENTS

| | | | |
|---|---|---|---|
| 5,018,964 A | 5/1991 | Shah | |
| 5,049,063 A * | 9/1991 | Kishida | F23N 5/123 431/63 |
| 5,186,541 A * | 2/1993 | Paulk | G01J 5/026 702/135 |
| 5,628,242 A | 5/1997 | Higley | |
| 5,813,394 A | 9/1998 | Clifford | |
| 6,155,160 A | 12/2000 | Hochbrueckner | |
| 6,684,757 B2 | 2/2004 | Petersen | |
| 6,733,276 B1 | 5/2004 | Kopping | |
| 7,112,059 B2 | 9/2006 | Donnelly | |
| 8,746,275 B2 * | 6/2014 | Santinanavat | G05D 7/0617 251/30.01 |
| 9,345,362 B2 | 5/2016 | Huang et al. | |
| 9,480,358 B2 | 11/2016 | Albizuri et al. | |
| 9,791,063 B2 | 10/2017 | Querejeta et al. | |
| 10,180,691 B2 | 1/2019 | Barkhouse et al. | |
| 10,344,984 B2 | 7/2019 | Golomb et al. | |

(Continued)

OTHER PUBLICATIONS

"Gas Fire Pit Controls Explained", retrieved from https://www.finesgas.com/gas_fire_pit_controls_explained on Jun. 28, 2022.

(Continued)

*Primary Examiner* — Vivek K Shirsat
(74) *Attorney, Agent, or Firm* — Burdick Patents, P.A.; Sean D. Burdick; Colin L. Honan

(57) ABSTRACT

A specialized miniature housing installable between a source of gas and gas burners provides an aftermarket safety system for a gas grill. The system prevents accidental accumulation of gas in an enclosed volume within or around an unignited grill, thereby reducing or eliminating the risk of explosion. The housing includes a microcontroller coupled to an internal flow sensor, an external temperature sensor, and a valve. In response to signals received from the sensors, the microcontroller commands the valve to remain open only when positive flow through the housing is coincident with sufficient temperature at the burners. Otherwise, or upon loss of power, the valve closes to cut off gas supply to the grill.

20 Claims, 10 Drawing Sheets

(56) References Cited

U.S. PATENT DOCUMENTS

| | | |
|---|---|---|
| 10,509,381 B2 | 12/2019 | Jablokov et al. |
| 11,067,285 B2 | 7/2021 | Querejeta et al. |
| 2001/0042564 A1 | 11/2001 | Abraham et al. |
| 2006/0118181 A1 | 6/2006 | Landon |
| 2008/0108002 A1 | 5/2008 | Huang |
| 2015/0346733 A1* | 12/2015 | Yates ................ F02M 21/0218 |
| | | 700/282 |

OTHER PUBLICATIONS

Everything you need to know about Gas Solenoid Valves, retrieved from https://www.processindustryforum.com/article/everything-need-know-gas-solenoid-valves on Jun. 28, 2022.

GASAV-R automatic Gas Shut Off Valve, retrieved from https://gasav-r.com/ Jun. 28, 2022.

MeTer Star Propane lpg Gas fire Pit Control Safety Valve Flame Failure Device, retrieved from https://www.amazon.com/MeTer-Star-Propane-Control-thermocouple/dp/B07D3Q8KRQ on Jun. 28, 2022.

No Worriez 80,000 BTU Safety Automatic Outdoor BBQ Shut Off Mechanical Structure Gas Timer, retrieved from https://www.amazon.com/NO-WORRIEZ-Automatic-Mechanical-Structure/dp/B09NBFJR55/ref=sr_1_1?keywords=NO%2BWORRIEZ%2B80%2C000%2BBTU%2BSafety%2BAutomatic%2BOutdoor%2BBBQ%2BShut%2BOff&qid=1654108411&sr=8-1&th=1 on Jun. 28, 2022.

\* cited by examiner

SAFETY SYSTEM FOR GAS GRILL

RELATED APPLICATIONS

This application claims priority to U.S. Provisional Application No. 63/389,819 filed Jul. 15, 2022, the contents of which are incorporated herein by reference.

BACKGROUND OF THE INVENTION

Field of the Invention

The present invention relates generally to gas grills and grill accessories, and more particularly to a safety system for a gas grill.

Description of Related Art

Gas grills are commonly used as an alternative to charcoal grills in both residential and commercial settings. In recent years, it has become popular to incorporate gas grills into outdoor kitchens that include countertops usually constructed of masonry such as stone, brick, or tile. The masonry surrounding the grill provides additional counterspace for food preparation, and may improve the aesthetic appearance of the outdoor kitchen. Outdoor kitchens are often added to the backyard or patio area of a home long after original construction of the home has been completed. Too often, outdoor kitchens are built by amateurs or non-licensed contractors, and escape the scrutiny of licensed contractors or home inspectors to ensure compliance with building and safety codes. Substandard outdoor kitchens may include gas grills enclosed within masonry that is not properly ventilated.

Improperly vented gas grills can create a significant risk of personal injury or property damage. For example, if a flow of gas such as propane is provided to the burners and the burners fail to ignite, the volatile gas can accumulate within an enclosed or improperly ventilated volume. An unsuspecting operator approaching the grill and seeing idle burners may attempt to ignite them, and accidentally touch off the propane bomb that has accumulated. The resulting explosion can cause serious bodily injury to the operator or start fire to a nearby structure.

The scenario just described is unfortunately all too common. Over the five-year period from 2014 to 2018, the National Fire Protection Association (NFPA) reported that on average, 8,900 residential fires were caused each year by grills, and that five of every six grills involved in home fires were fueled by a gas such as propane. The NFPA further identified the primary cause of such fires to be a leak or break in the gas line, many of which ultimately led to an explosion.

What is needed is a safety system to prevent the undesired accumulation of gas used as fuel for gas grills.

SUMMARY OF THE INVENTION

A safety system for gas or propane grills is disclosed. The safety system can be integrated into newly manufactured grills or installed on existing grills as an aftermarket modification. Installation on existing grills requires minimal modification to the grill.

According to one embodiment, the safety system has a miniaturized housing with a gas inlet and a gas outlet. Enclosed within the housing is a tube which fluidically connects the gas inlet to the gas outlet. A controller within the housing is coupled to a power source and further coupled to an internal sensor and to an external sensor. The internal sensor is configured to sense a flow rate of gas through the tube and communicate the sensed flow rate to the controller. A valve is positioned in line with the tube, preferably proximate to the gas outlet, and is configured to change state in response to a signal received from the controller. The external sensor senses a temperature remote from the housing, e.g., at the grill, and communicates the sensed temperature to the controller.

In some embodiments, the tube may be a venturi tube and the internal sensor may be a flow sensor or one or more pressure transducers. Preferably, there are two pressure transducers positioned in the venturi tube to sense an upstream pressure and a downstream pressure. The pressure transducers communicate the upstream and downstream pressures to the controller which has a routine encoded in software and stored in memory for calculating a flow rate based on a pressure differential created through the venturi tube. The controller may be configured to execute the routine in response to a power "on" signal.

In some preferred embodiments, the external sensor may be an infrared temperature sensor electrically coupled to the controller by an instrumentation wire or cable. Further, the housing may include a cover removably attached to a base by at least one fastener extending through at least one post formed as part of the base. In preferred embodiments, the cable of the infrared external sensor is at least partially wrapped around the post to relieve strain exerted on the cable. In alternative embodiments, the base may be rectangular shaped and have a post formed in each corner thereof. One fastener per post can be used to securely attach the cover to the base.

The valve may be a solenoid valve. Further, the valve may be a normally closed valve. In preferred embodiments, the valve is a normally closed solenoid valve that when energized by the controller, moves to an open position to allow gas to flow through the gas outlet. The safety system may also include a switch electrically coupled to the controller and operable between "on" and "off" positions. When the switch is in the "on" position, the controller energizes the valve to open and when in the "off" position, the valve is deenergized and closes.

Various other routines may also be encoded in software and stored in the memory of the controller. These routines are programmed to change the state of the valve in response to input signals received from the internal and external sensors.

One such routine involves first sending a command to the valve to open. This allows gas to flow through the safety system in a scenario where there is an adequate gas supply to the gas inlet and the burners of the grill have been opened or turned on. The controller receives a first signal from the internal sensor which will either be a positive or negative signal. A negative signal indicates no gas flow, or a flow that is below a minimum flow threshold that is required for operation of the grill. A positive signal indicates a positive flow rate through the safety system, i.e., a flow of gas from the gas supply through the tube, through the gas outlet, and to the opened burners. After receipt of a positive signal, the controller next receives an initial signal from the external sensor, which will typically indicate the ambient temperature of the grill at or near the time of an attempted burner ignition. The controller maintains the valve in the open position for preset period of time before receiving an updated signal from the external sensor. The controller compares the initial signal to the updated signal to calculate a temperature differential. The controller compares the temperature differential to a preset threshold to determine if burner ignition was successful. If the temperature differential exceeds the preset threshold, burners have been ignited and the valve is maintained in the open position. However, if the temperature differential does not exceed the preset threshold, the attempted burner ignition was not successful and the controller deenergizes the valve. The preset period of time before the controller receives the updated signal from the external sensor may be programmable by an operator. For instance, the safety system may communicate with a mobile phone application via wireless communication technology, where the phone application can set the period of delay before the controller receives the updated signal. Alternatively, the safety system may include a timing dial or other manipulable setting on a user interface that an operator may manually set to a desired time, e.g., 5 to 10 minutes or more depending on the grill type.

The routine thus described can further include steps for receiving a continuous signal from the external sensor after successful burner ignition has been determined. The controller thereafter will periodically compare the continuous external signal to a preset minimum temperature. The controller will maintain the valve in the open position so long as the continuous external signal exceeds the minimum temperature. Upon receiving a continuous signal below the minimum temperature, the controller will deenergize the valve thereby cutting off the gas supply to the grill. The minimum temperature may be programmable by an operator similar to the preset time period described above, e.g., through wireless communication with a mobile application or by manual controls mounted locally to the safety system.

In alternative embodiments, an alternate routine may be encoded in software and stored in the memory of the controller which can execute the routine in response to signals received from the internal and external sensors. Similar to the first routine described above, the routine begins with sending a command signal to the valve to open, e.g., energizing the valve upon initial power up of the safety system. The controller next receives a signal from the internal sensor indicating either a positive or negative flow. If the signal is negative, e.g. no flow sensed, the controller deenergizes the valve. If the signal is positive, the controller maintains the valve in the open position for a preset period of time. Upon expiration of the preset time period, the controller will receive an external signal from the external sensor and compare the external signal to the preset minimum temperature. If the external signal does not exceed the minimum temperature, the controller deenergizes the valve. However, if the external signal does exceed the minimum temperature, the controller maintains the valve in the open position. The controller thereafter may continually or periodically receive an updated external signal and compare that signal to the minimum temperature until such time that the updated external signal drops below the minimum temperature, at which point the controller deenergizes the valve.

These and other aspects of the invention will become apparent to those skilled in the art in view of the following disclosure.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of a safety system that can be used in conjunction with propane or other gas grills (any of which are hereafter referred to as a "grill"). The safety system is designed as an after-market addition to existing grills that can be installed with relative ease and minimal installation steps. The safety system can also be incorporated into newly manufactured grills. For incorporation into new grills, the safety system can be integral to an existing gas connection line, and proximate to the grill burners. In general, the safety system operates as an automatic shutoff valve to cut off the supply of gas to a grill under certain conditions.

Figure 1:
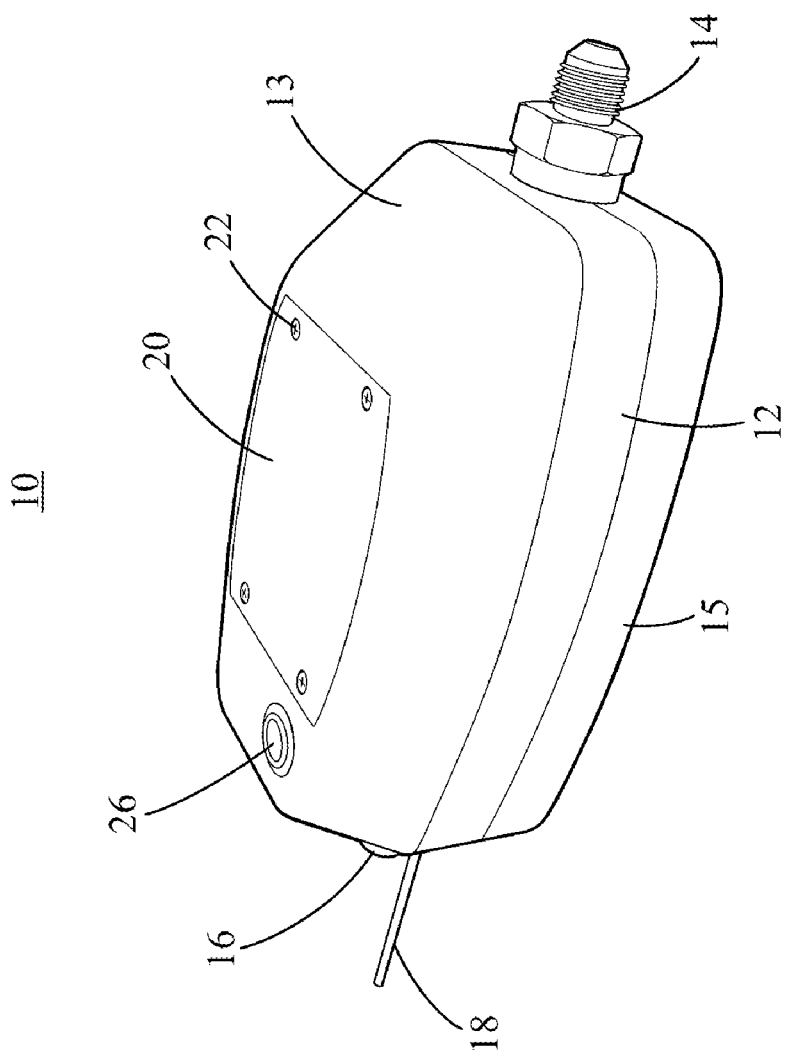
FIG. 1 is a perspective view of one embodiment of an outer housing of a safety system according to the present invention.

FIG. 1 is a perspective view of a first embodiment of a safety system 10 according to the present invention. The safety system 10 has a miniaturized housing 12 with a defined gas inlet 14 in fluid communication with a gas outlet 16. The housing may be made of any rigid, protective material (such as metal or plastic) that is rated for outdoor usage in high temperature environments. Proximate to the gas outlet 16, an external sensor 18 is coupled to the housing 12. The housing 12 can have a plate 20 removably attached thereto by one or more fasteners 22. In some embodiments, the housing 12 comprises two pieces including a cover 13 that is detachable from a base 15, as is detailed further below. The gas inlet 14 is configured to removably connect the safety system 10 to an external gas source, such as a propane tank. The gas inlet 14 can therefore be threaded to engage with a gas hose extending from the gas source, as is conventional for propane gas tank hookups. Similarly, the gas outlet 16 is configured to removably connect the safety system 10 to a grill. The gas outlet 16 can therefore be threaded to engage with a gas hose or gas line extending from the grill. Thus, the safety system 10 fluidically connects an external gas source to a grill.

Figure 2:
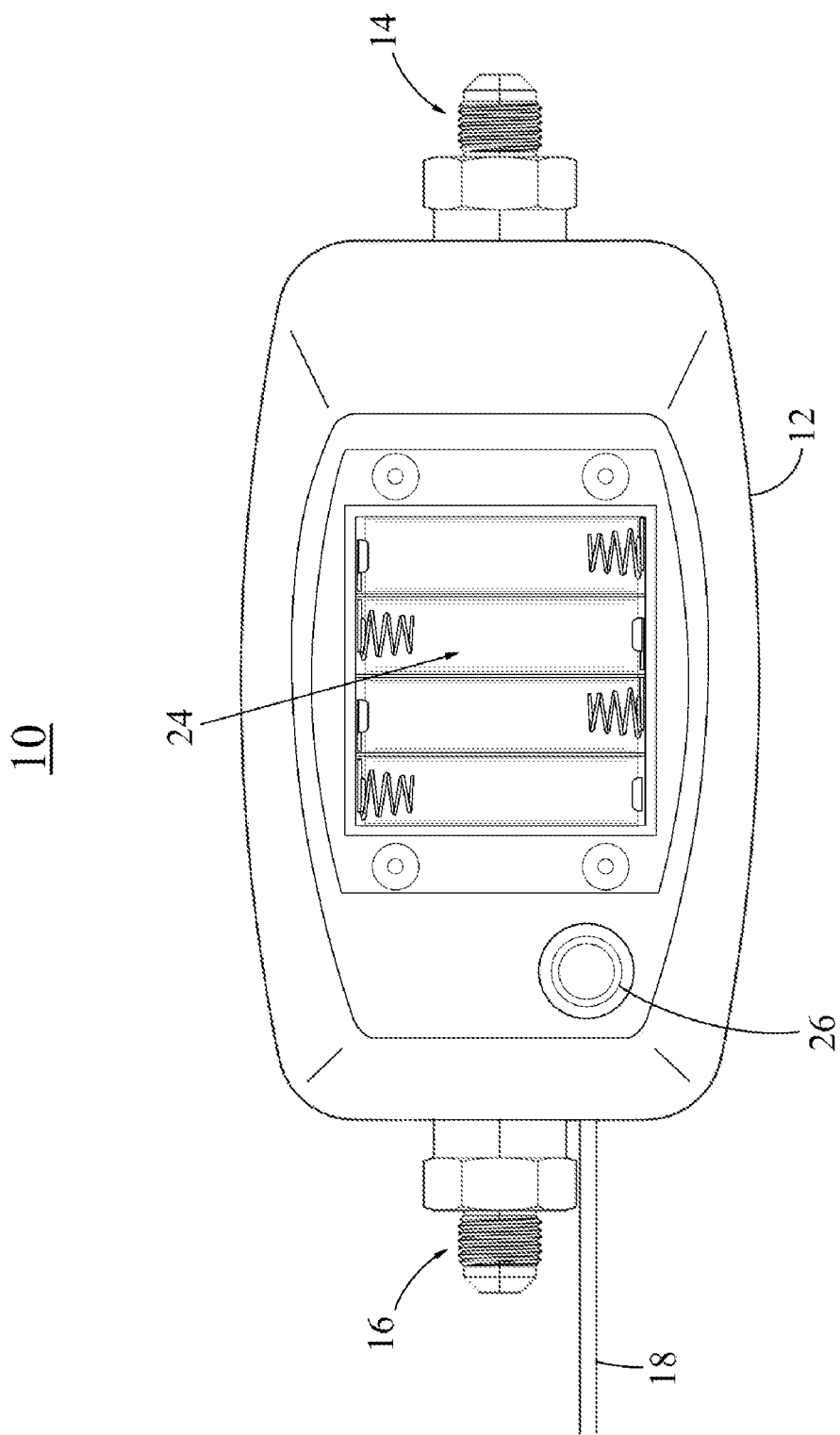
FIG. 2 is a top view of the housing of FIG. 1, showing an exposed internal battery compartment.

FIG. 2 is a top view of the housing 12 having its plate 20 removed. The plate 20 can enclose a power source 24, such as a battery pack, that is electrically coupled to a controller 30. Depending on the embodiment, the battery pack can be rechargeable or disposable. In alternative embodiments, the power source 24 can be an electrical cord that can plug into an outlet, such as a standard 120 VAC outlet. A power button 26 can also be mounted on the housing 12. In some embodiments, the power button 26 may include a power indicator, such as an LED light, to indicate to the operator that the safety system 10 is powered on and functioning. Further, the power button 26 may include means for generating an alert, such as a flashing LED light, that may be activated when the safety system 10 detects an error or other fault in the system. The alert means may be automatically activated in response to a detected state of the safety system 10, as described in more detail below.

Figure 3:
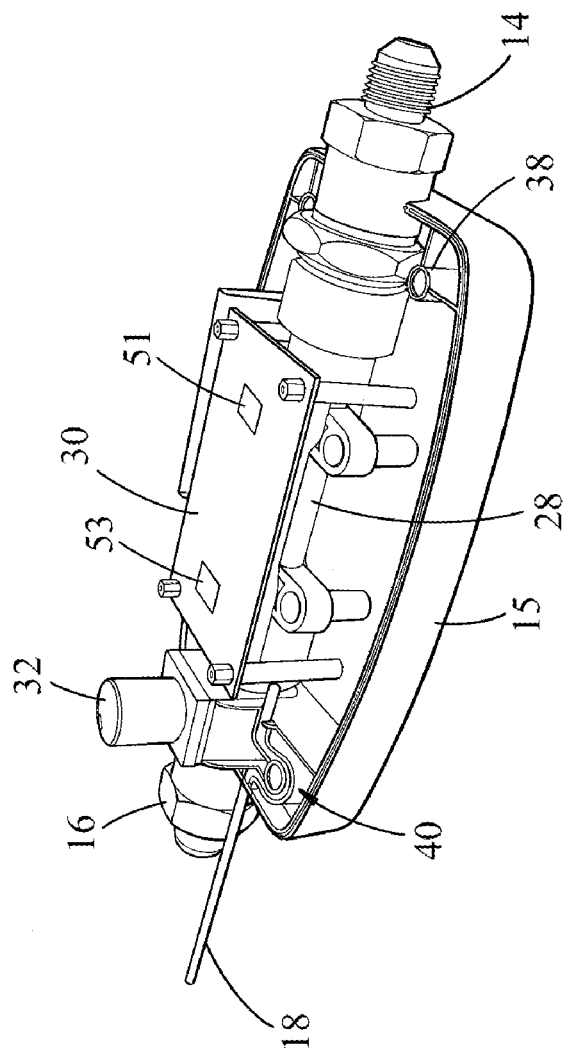
FIG. 3 is a perspective view of an uncovered base portion of the housing of FIG. 1, showing internal components.

FIG. 3 is a perspective view of the housing 12 with the cover 13 removed therefrom. Mounted to the base 15 and enclosed within the housing 12 is a tube 28 which fluidically connects the gas inlet 14 to the gas outlet 16. Further enclosed within housing 12 is a controller 30, having memory, electrically coupled to a valve 32 and to at least one internal sensor 34. The external sensor 18 is also electrically coupled to the controller 30. The valve 32 is in line with the tube 28 and in fluid communication with the gas inlet 14 and gas outlet 16.

Figure 4:
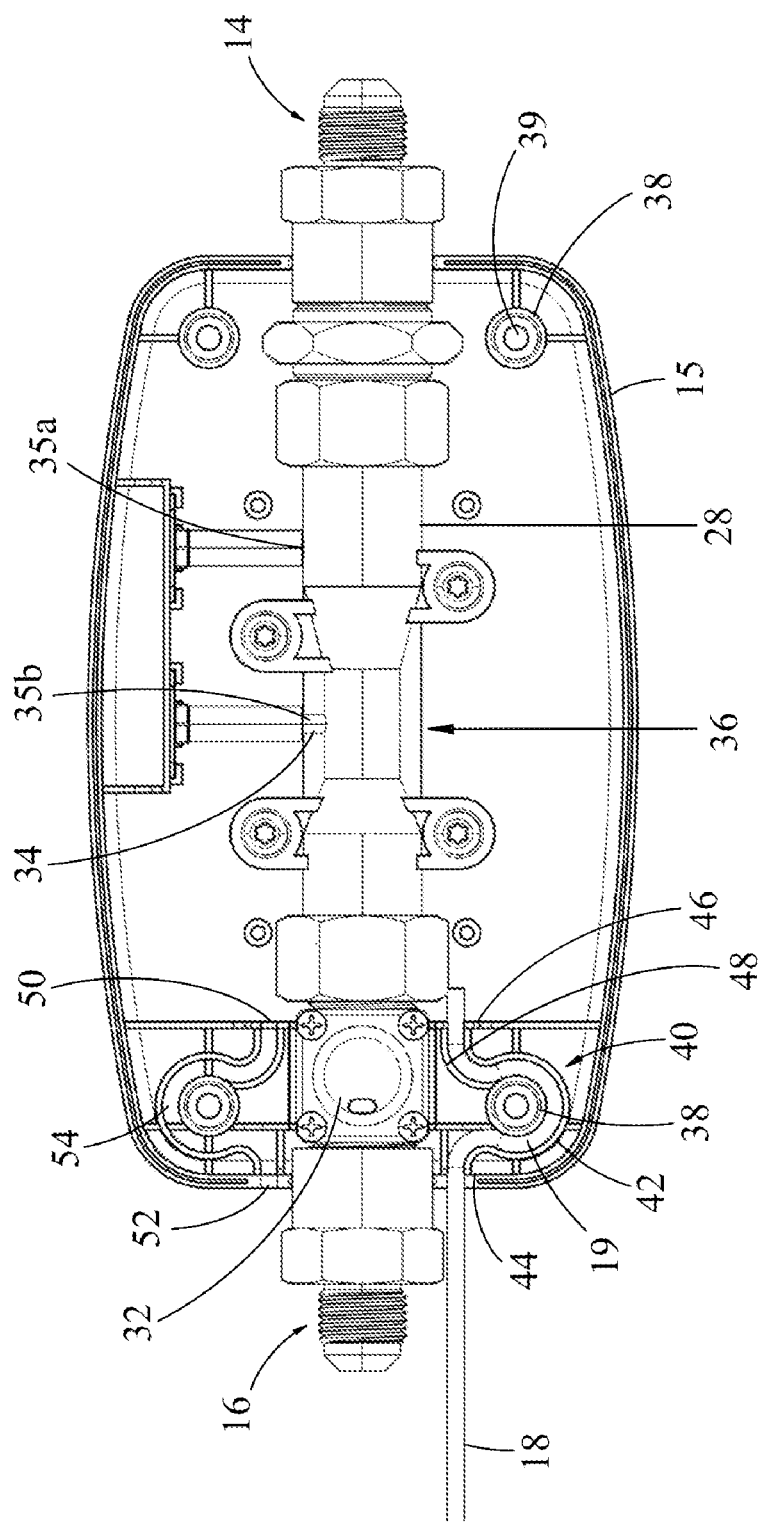
FIG. 4 is a top view of the base portion of FIG. 3, showing mechanical components for fluid flow.

FIG. 4 is a top view of an embodiment of the base 15 of the housing 12. In some preferred embodiments, the tube 28 comprises a venturi tube 36 in communication with the internal sensor 34. In one embodiment, internal sensor 34 is a flow sensor. In another embodiment, the internal sensor 34 comprises pressure transducers 35a and 35b configured to sense a differential pressure of gas flowing through the venturi tube 36 and to communicate sensed pressures to the controller 30. The first pressure transducer 35a is positioned upstream in the venturi tube 36 and configured to sense the upstream gas pressure. The second pressure transducer 35b is positioned downstream in the venturi tube 36 and configured to sense the downstream gas pressure. The controller 30 is configured to execute a first routine encoded in software and stored in the controller memory for calculating a gas flow rate through the venturi tube 36 based on a pressure differential derived from pressures communicated from the pressure transducers 35a, 35b, as will be explained in more detail below.

The valve 32 can be positioned downstream from the internal sensor 34 proximate to the gas outlet 16. The valve 32 can be a solenoid valve electrically coupled to the controller 30 and configured to open and close in response to signals received from the controller. In some embodiments, the valve 32 can be a normally closed valve to ensure that gas cannot flow through the outlet 16 when the safety system 10 is powered off. Further, valve 32 as a normally closed valve ensures that the safety system 10 will revert to a safe position, i.e., closed, in the event of a system failure.

The base 15 has at least one post 38 having a height substantially equal to the depth of the base. In some embodiments, there are four posts 38, each positioned proximate to a corner of the base 15. Each post 38 has an aperture 39 defined therethrough. The aperture 39 is configured to receive a fastener to removably attach the cover 13 to the base 15.

In preferred embodiments, at least one of the posts 38 proximate to the gas outlet 16 end has a relief assembly 40. The relief assembly 40 has a curved wall 42 extending from a base wall 44 to an inner wall 46. The curved wall 42 at least partially circumvolves the post 38, preferably forming a horseshoe-shaped curvature about the post. A second curved wall 48 extends from the post 38 to the inner wall 46. An opening 50 is defined through the inner wall 46 between the terminal ends of the curved wall 42 and second curved wall 48. A notch 52 is defined in the base wall 44, proximate to the start of the curved wall 42. A channel 54 connects the notch 52 to the opening 50 and is formed between the curved wall 42 and the post 38. The channel 50 is horseshoe-shaped as a result of the curvature of the walls 42, 46.

The relief assembly 40 is configured to relieve strain and other tensions that may be exerted on the external sensor 18, or on its cable 19, to ensure the electrical connection to the controller 30 is not broken or otherwise disrupted. Thus, the cable 19 of the external sensor 18 is configured to extend through the relief assembly 40 to electrically couple the sensor to the controller 30. In some preferred embodiments, the external sensor 18 is an infrared sensor electrically coupled to the controller 30 by the cable 19. The cable 19 extends through the channel 54 of the relief assembly 40 to connect with the controller 30. The horseshoe-shape of the channel 50 reduces the strain and tension exerted on the cable 19. Thus, the relief assembly 40 protects the electrical connection between the external sensor 18 and the controller 30 throughout normal handling and use of the safety system 10. In some embodiments, there may be two relief assemblies 40 formed on either side of the gas outlet 16. Such embodiments allow the external sensor 18 to be connected to the controller 30 from either side of the gas outlet 16, which allows an operator to select the best position of the external sensor 18 relative to the grill.

Figure 5:
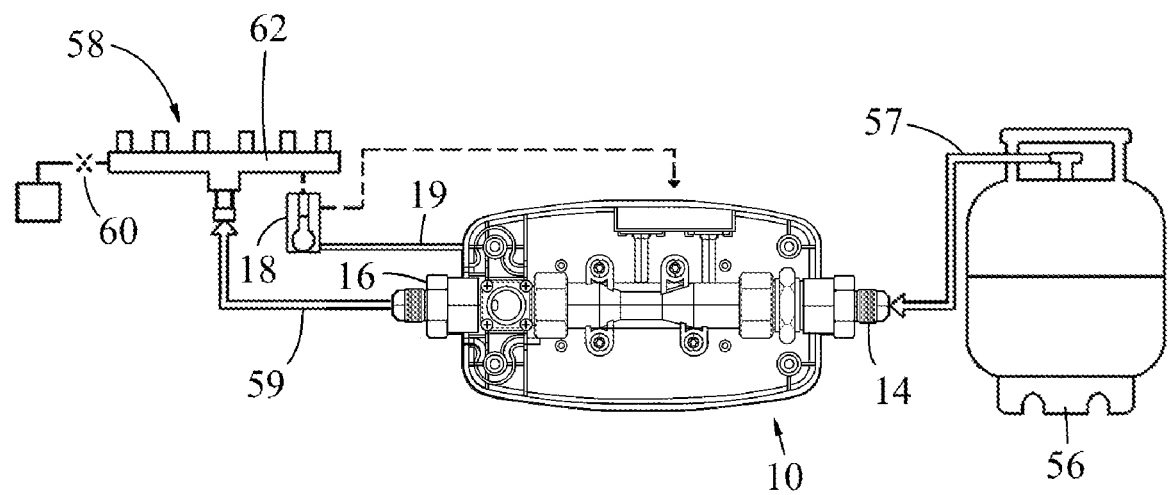
FIG. 5 is a block diagram of one embodiment of a safety system according to the present invention, coupled between a gas source and a grill.

FIG. 5 is a block diagram showing safety system 10 of the present invention coupled between a gas source 56 and a grill 58. The gas inlet 14 is coupled to gas source 56, e.g., a propane tank, by a hose 57. The gas outlet 16 couples the safety system 10 to grill 58, typically by a second hose 59. The external sensor 18, e.g., an infrared temperature sensor, is positioned proximate to the burners 62 of the grill 58 and is electrically coupled to the safety system 10 by the cable 19. The dashed line illustrates the communication link between the external sensor 18 and the controller 30. As is conventional for grills 58, an igniter 60 is used to ignite the burners 62 when gas is flowing to the grill.

Figure 6:
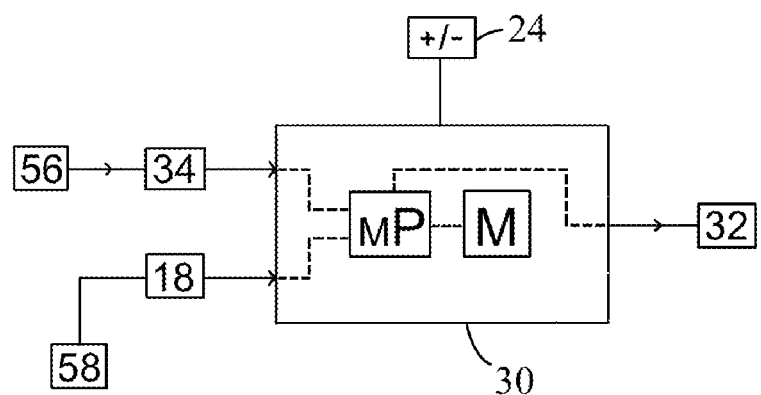
FIG. 6 is a schematic block diagram representing input and output signals of a controller in one embodiment of the safety system according to the present invention.

FIG. 6 is a schematic block diagram representing input and output signals of the controller 30 in one embodiment of the safety system 10 according to the present invention. The controller 30 has an internal microprocessor ($_\mu$P) in communication with memory (M). The internal sensor 34 is in line with the gas source 56 and configured to communicate a sensed flow rate to the controller 30. In preferred embodiments, the internal sensor 34 is configured as two pressure transducers 35a, 35b positioned in a venturi tube 36 to communicate an upstream pressure and a downstream pressure to the controller 30. The controller 30 uses these signals to calculate a flow rate using the pressure differential sensed by the internal sensor 34. The external sensor 18 is positioned proximate to the grill 58 and communicates a sensed temperature to the controller 30. The external sensor 18 is preferably an infrared temperature sensor. The controller 30 is electrically coupled to the power source 24, which provides power to the safety system 10. Further, the controller 30 is electrically coupled to the valve 32, e.g., solenoid valve, and configured to send a command to the valve depending on the input signals received from the external sensor 18 and internal sensor 34.

Figure 7:
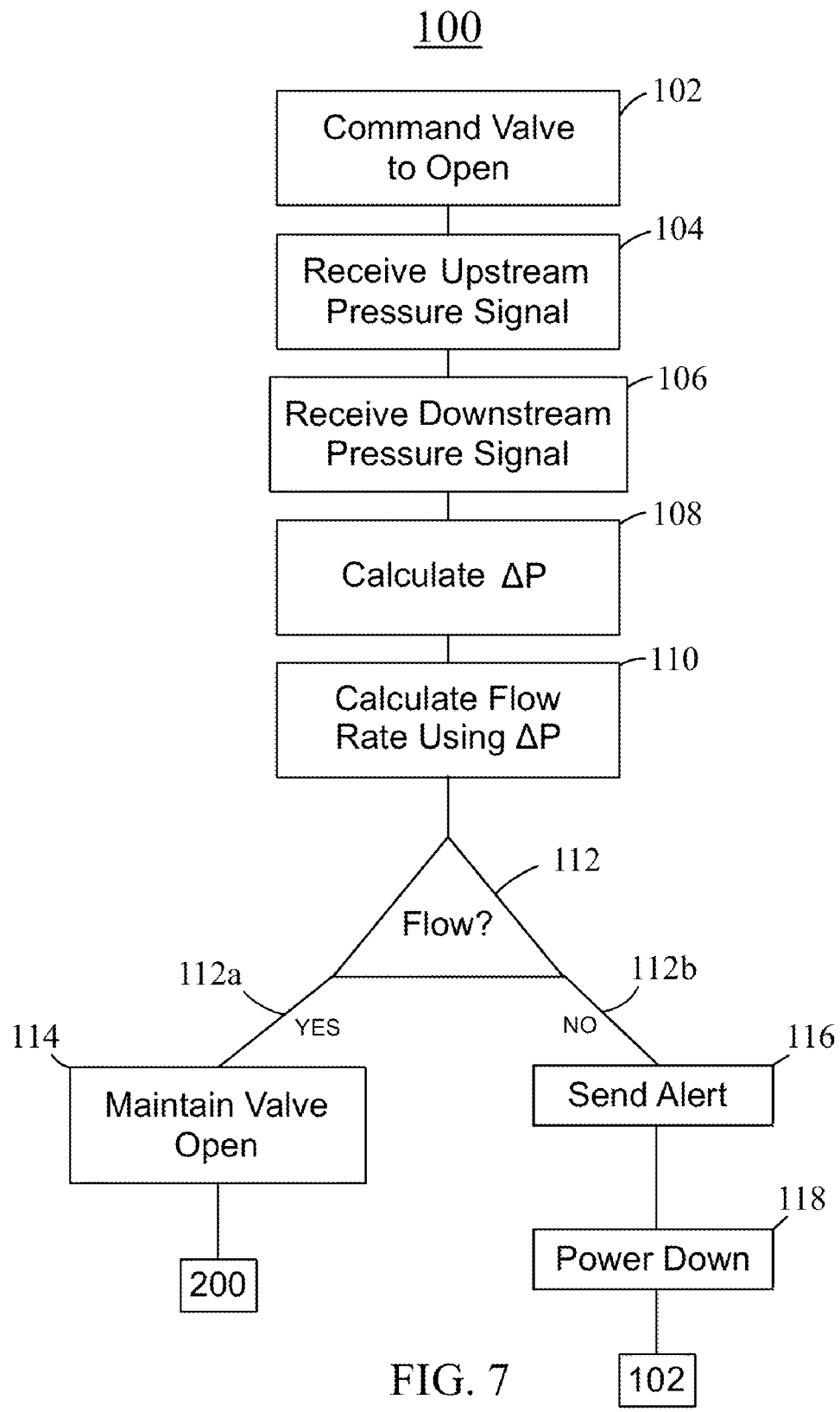
FIG. 7 is a process flow diagram of one embodiment of a control scheme executable by the safety system according to the present invention.

FIG. 7 is a process flow diagram showing salient steps of one embodiment according to the invention of a routine 100 executable by the controller 30. The routine 100 is encoded in software and stored in the memory (M) of the controller 30. The routine 100 uses known principles of fluid dynamics to calculate the flow rate through the venturi tube 36 based on a pressure differential calculated from signals received from the upstream pressure transducer 35*a* and the downstream pressure transducer 35*b*. Flow rate equations using a pressure differential calculated from a venturi tube are well known in the art of fluid dynamics.

At step 102, the controller 30 commands the valve 32 to open. The command is typically responsive to the safety system 10 being energized through engagement of the power button 26, e.g., depression of the power button energizes the controller which sends a command to the valve to open. Next at steps 104 and 106, the controller 30 receives an upstream pressure signal from the first pressure transducer 35*a* and receives a downstream pressure signal from the second pressure transducer 35*b*. At step 108, the controller 30 calculates a pressure differential based on the received upstream and downstream pressure signals. The calculated pressure differential is then used by the controller 30 at step 110 to calculate the flow rate through the venturi tube 36. Note, steps 104 to 110 represent known principles of fluid dynamics for calculating a flow rate using pressure signals.

At step 112, the controller 30 determines whether there is a positive flow rate moving through the venturi tube 36 as a result of the gas tank 56 being turned on and the burners 62 being opened. If a positive flow rate is determined (112*a*), the controller at step 114 maintains the valve 32 in the open position to allow gas to continue flowing to the grill 58. With the valve 32 maintained in the open position, the controller executes a second routine 200, as detailed further below. However, if there is not a positive flow rate through the system 10 (112*b*), the controller may send out an alert at 116 to alert the operator indicating there is no gas flow. The alert may be an audible alarm that is activated by the controller or it may be a light, such as an LED indicator, that turns on, flashes, or changes color. In some embodiments, the alert may be both an audible and visual alarm to alert the operator there is no gas flowing through the safety system 10. After the alert signal has been sent, the controller signals the system to power down at step 118. In the powered down state, the valve 32 is deenergized and moves to its normally closed position so that no gas may flow through the system. The lack of flow through the safety system 10 may be a result of the gas tank 56 being turned off or empty. The lack of flow may also be caused by a leak in the gas line 57 connecting the gas tank 56 to the safety system. Regardless of the reason for no gas flow, the safety system 10 turns itself off to deenergize the valve 32 so that it reverts to its normally closed position. Alternatively at step 18, the safety system 10 deenergizes only the valve 32, causing it to close, while maintaining power to the controller 30.

Figure 8:
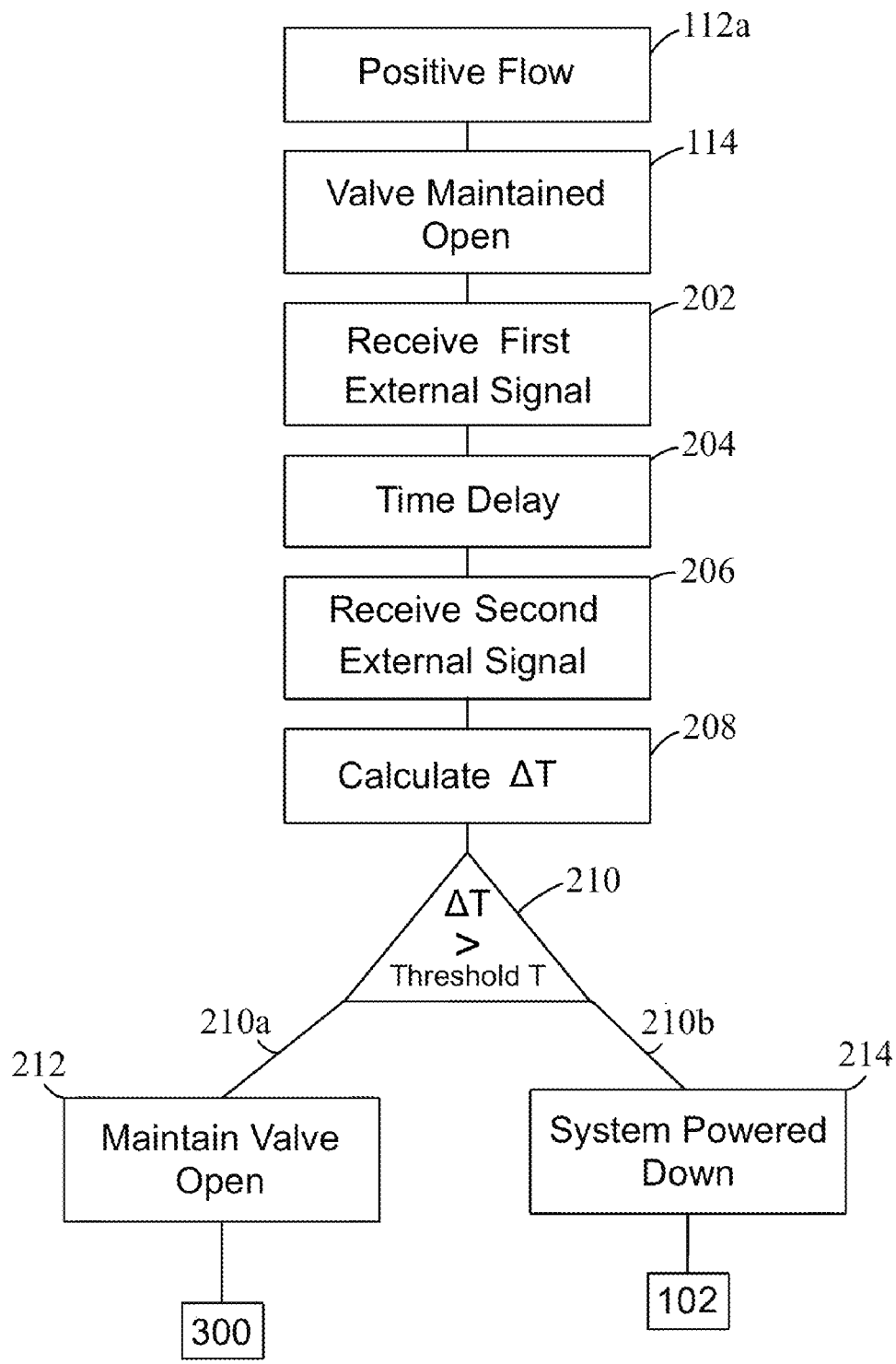
FIG. 8 is a process flow diagram of one embodiment of a second control scheme, executable by the safety system according to the present invention.

The flow routine 100 can be used by the controller 30 when the safety system is initially powered on. A second routine 200, the salient steps of which are illustrated as a process flow diagram in FIG. 8, is executable by the controller 30 after the safety system 10 has been powered on and the controller has determined there is gas flowing through the venturi tube 36. The second routine 200 is encoded in software and stored in the memory (M) of the controller 30 and is executable by the controller after completion of the flow routine 100. Alternatively, the second routine 200 may be executed by the controller 30 upon initial powering on of the safety system 10, depending on the embodiment utilized. The second routine 200 can be used by the safety system 10 to determine whether or not the burners 62 of the grill 58 have been properly ignited. If the safety system 10 determines the burners 62 have not been ignited, indicating that gas may be accumulating in the grill, the system 10 will automatically power down to cut off the supply of gas to the grill by deenergizing the valve 32 causing it to move to its normally closed position.

After the controller 30 completes the flow routine 100 and the valve is commanded to be maintained in the open position (114), the controller receives a first external signal at step 202. The first external signal is an initial temperature signal of the grill received from the external sensor 18. The first external signal will be indicative of the ambient temperature of the grill 58 prior to or immediately after an operator attempts to ignite the burners 62. After receiving the first external signal, the controller 30 maintains the valve 32 in the open position for a preset period of time at step 204. After expiration of the preset period of time, a second external signal is received from the external sensor 18 at step 206. The second external signal is an updated temperature signal received from the external sensor 18. Depending on whether or not burners 62 have been successfully ignited, the second external signal may indicate a temperature greater than the ambient temperature communicated by the first external signal.

At step 208 the controller 30 calculates a temperature differential by comparing the second external signal to the first external signal. Step 210 is a decision block in which the controller 30 determines whether the calculated temperature differential from step 208 is greater than a preset threshold. If the temperature differential is greater than the preset threshold (210*a*), the controller 30 maintains the valve 32 in the open position (step 212). A temperature differential greater than the preset threshold is indicative of successful burner ignition.

The preset threshold may be programmable by the operator. Preferably, the preset threshold is a number that will be sufficient to indicate successful burner ignition. For example, a preset threshold of 100 would be sufficient to indicate the successful burner ignition, i.e., if the calculated temperature differential is greater than 100 degrees, the burners have been successfully ignited. The preset threshold may be set to any number desired by the operator. A low temperature threshold number may be necessary in hot environments where the first external signal is already high because of ambient heat heating the grill 58 or the external sensor 18.

If the temperature differential is not greater than the preset threshold (210*b*), the controller 30 powers down the safety system 10 (step 214). In this state, the valve 32 is deenergized and reverts back to its normally closed position. A temperature differential that is not greater than the preset threshold is indicative of unsuccessful or faulty burner ignition. To avoid gas accumulating in the grill, the valve 32 deenergizes to the closed position thereby cutting off the supply of gas to the grill 58. Alternatively at step 214, the safety system 10 deenergizes only the valve 32, causing it to close, while maintaining power to the controller 30.

Figure 9:
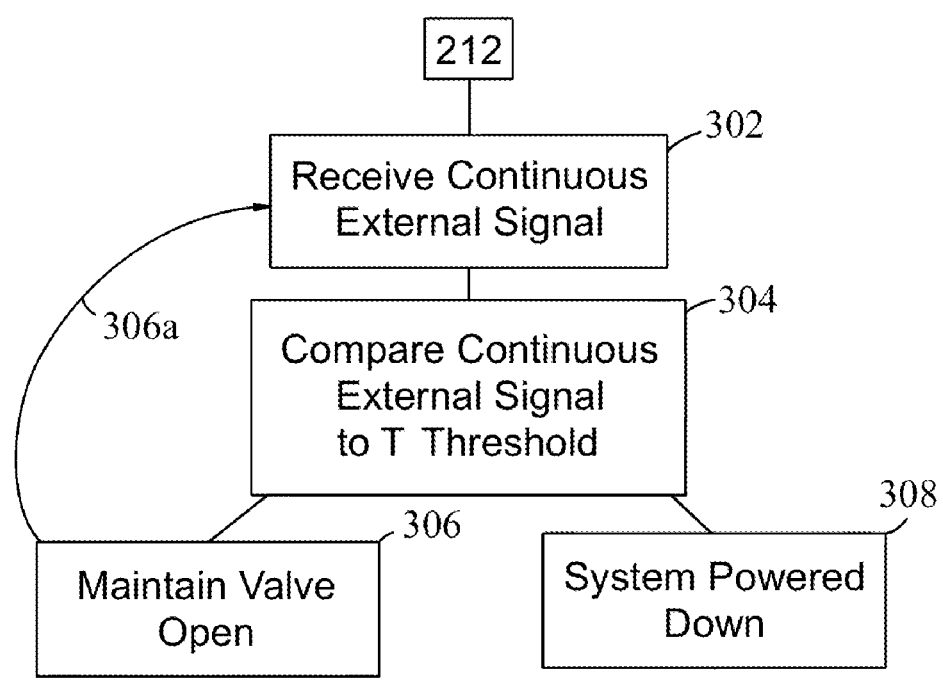
FIG. 9 is a process flow diagram of one embodiment of a third control scheme, executable by the safety system according to the present invention.

The salient steps of a third grilling routine 300 are illustrated as a process flow diagram in FIG. 9. The grilling routine 300 is executable by the controller 30 and is used after the controller has determined burners 62 have been successfully ignited, as indicated, e.g., by successful execution of the second routine 200. The grilling routine 300 is useful to ensure that the grill 58 is operated in a safe manner throughout the grilling operation. If at any point during the grilling operation the burners inadvertently become extinguished, the safety system 10 can automatically power itself down and cut off the gas supply to the grill by deenergizing valve 32 to its normally closed position.

The grilling routine 300 continues from step 212 of the second routine 200, at which the valve 32 has been maintained in the open position. At step 302, the controller 30 receives a continuously generated external signal from the external sensor 18. The continuously generated external signal (or "continuous signal") represents an active temperature reading of the grill 58. Controller 30 may be programmed to sample the continuous signal at periodic intervals. At step 304, the controller compares a sampled value of the continuous signal to a preset minimum temperature. If the sampled value is greater than the minimum temperature, the controller 30 maintains the valve 32 in an open position (step 306). The grilling routine 300 thereafter repeats (306a) steps 302 to 306 until such time that the value of the continuous signal falls below the minimum temperature. The minimum temperature may be programmable by an operator and in one preferred embodiment is set to approximately 100 degrees Fahrenheit below the desired cooking temperature, although other minimum temperatures may be programmed by the operator as desired. For instance, if an operator desires to cook at a temperature around 350 degrees Fahrenheit, the minimum temperature may be set to 225 degrees Fahrenheit. This ensures the safety system 10 will not inadvertently cut off the gas supply due to a small drop in sensed temperature that may be caused by the operator temporarily reducing temperature while cooking, or by accidentally turning off the burners momentarily. Further, using a minimum temperature of at least 100 degrees Fahrenheit lower than the desired cooking temperature allows the operator to lower the grilling temperature without risk of the grill being shut off, for instance, after meat is cooked but while the operator leaves the meat on the grill to keep it warm.

When the value of the continuous signal falls below the minimum temperature, the safety system 10 will, at step 308, deenergize the valve 32 so that it reverts to its normally closed position, thereby cutting off the supply of gas to the grill 58.

The three routines 100, 200 and 300 executable by the controller 30 ensure that a grill is operated and maintained in a safe manner, significantly reducing the risk of gas accumulation that may result in an explosion. Each of these routines is executed during a distinct stage of the grilling operation, i.e., from initial grill startup to grilling the food to keeping the cooked food warm, to thereby reduce the risk of an explosion from the first attempt at burner ignition all the way through the completion of grilling the food.

Figure 10:
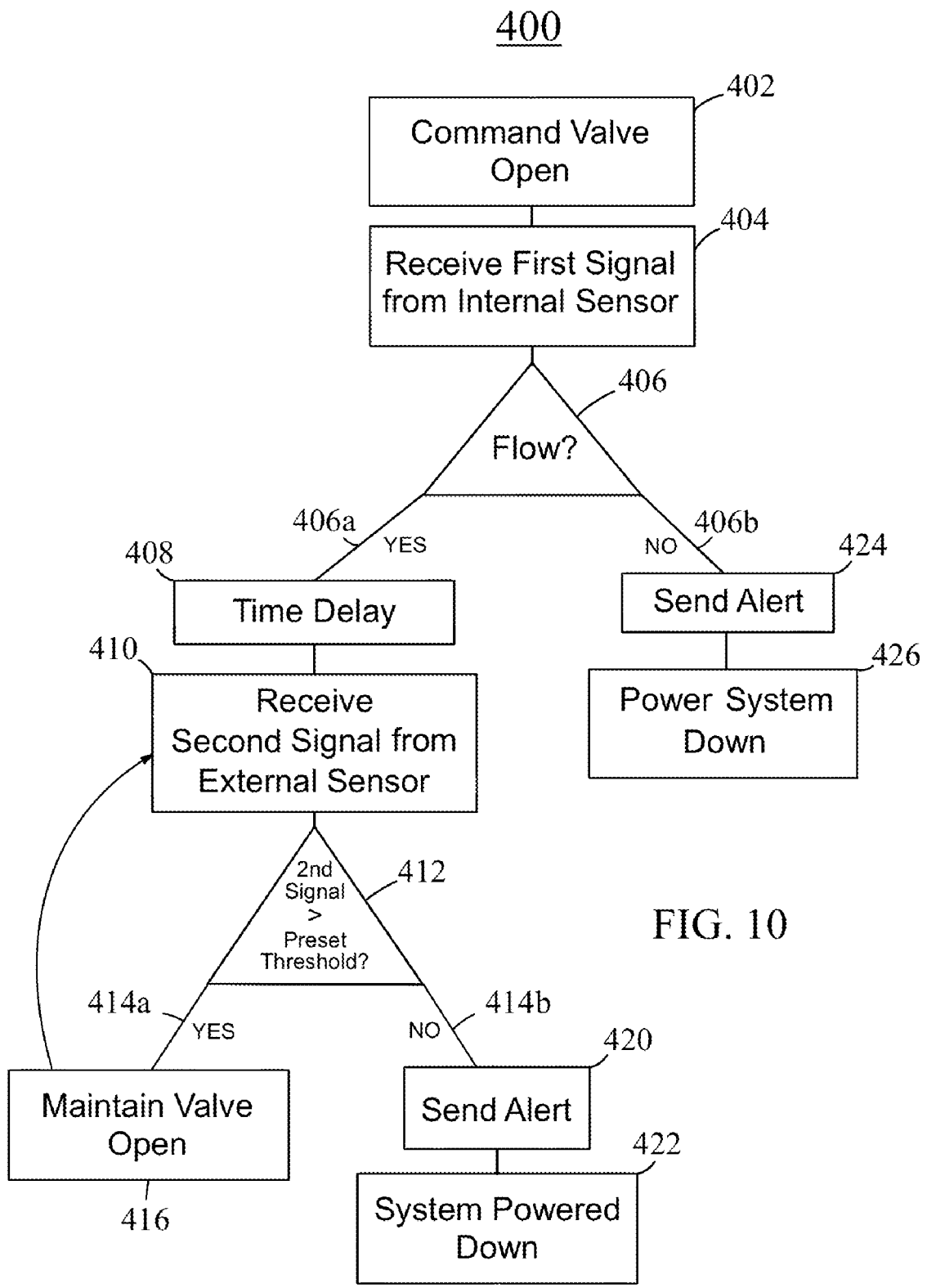
FIG. 10 is a process flow diagram of an alternative control scheme, executable by the safety system according to the present invention.

In alternative embodiments, the controller 30 may execute a fourth routine 400, the salient steps of which are illustrated as a process flow diagram in FIG. 10. Fourth routine 400 may incorporate the first routine 100 for determining whether there is a positive flow rate through the venturi tube 36. Alternatively, in embodiments of the safety system 10 utilizing a tube 28 with the internal sensor 34 configured as a flow sensor, the fourth routine 400 may not need to incorporate the first routine 100. Thus, fourth routine 400 may cover all distinct stages of a grilling operation as a stand alone process, from the initial grill start up to a final food warming stage.

Fourth routine 400 begins with step 402 where the controller 30 sends a command to the valve 32 to open. Typically, step 402 involves powering on the safety system 10 in which case the controller 30 energizes the valve 32 so that it changes state from the normally closed position to the open position. With the valve 32 in the open position, the controller 30 receives a first signal from the internal flow sensor 34. When the first signal is negative, there is no flow through the safety system 10 (406b) and the controller sends out an alert (step 424). The alert may be the same as previously described, e.g., an audible or visual alarm to alert the operator there is no sensed flow through the safety system 10. Thereafter, at step 426, the safety system 10 is powered down in which case the valve 32 is deenergized and reverts back to the normally closed position.

A positive first signal from the internal flow sensor 34 indicates there is gas flowing through the safety system 10 (406a). With gas flowing through the system, there is a time delay (step 408) prior to advancing to the next step. The time delay is programmable by the operator and preferably set to a sufficient amount of time to allow for the grill to noticeably heat up once the burners 62 are turned on. The time delay may vary depending on the grilling environment, the type of fuel, and the type of grill used. For example, the time delay may be 10 seconds, 30 seconds, 60 seconds, or more, to allow for sufficient heating of the grill. Further, the exact placement of the external sensor 18 may influence the amount of time required for the time delay in step 408. For example, if the external sensor 18 is positioned to take a temperature reading directly from one or more burners, a very short time delay may be used because the temperature at the burners will increase relatively quickly when ignited in comparison to the entire volume enclosed by a grill lid.

Upon expiration of the time delay, the controller receives a second signal from the external sensor (step 410). The second signal received is a temperature reading of the grill 58 after it has had sufficient time to heat up. At step 412, the controller 30 compares the second signal with a preset temperature threshold. If the second signal is greater than the preset temperature threshold (414a), the controller 30 maintains the valve in the open position (416). The fourth routine 400 thereafter loops back to step 410 and repeats these steps until such time that the second signal falls below the preset temperature threshold. The preset temperature threshold may be programmable by an operator and should be set above the ambient temperature of the environment but below the desired cooking temperature, e.g., between 130 to 175 degrees Fahrenheit.

If the second signal is not greater than the preset temperature threshold or it later falls below the threshold (414b), the controller can send an alert (420) and the system is thereafter powered down (422). The alert may be the same as previously described and the powering down of the system causes the valve 32 to revert back to the normally closed position. A second signal that is below the preset temperature threshold is indicative of the burners becoming extinguished, which means gas may be accumulating in the grill. Thus, to avoid the buildup of gas and potential for an explosion, the safety system 10 will automatically power down to cut off the gas supply.

Figure 11:
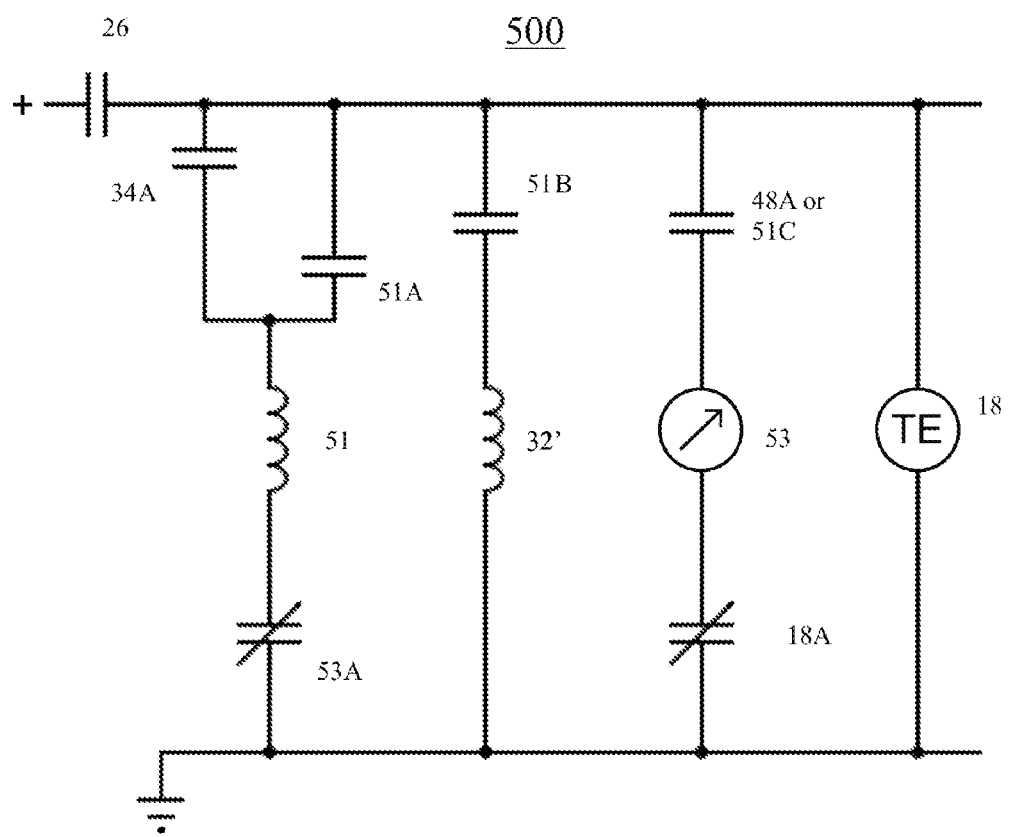
FIG. 11 is an electrical one-line diagram of another embodiment of a safety system for a gas grill according to the present invention.

Another embodiment of a safety system 500 for a gas grill according to the present invention is depicted in the electrical one-line diagram of FIG. 11. System 500 can be used in conjunction with the components shown in FIGS. 1 to 6 and described in this disclosure. With reference to FIG. 11, the following paragraphs disclose operational scenarios of the invention in which a control relay 51 is used to govern operation thereof, and in which a pressure switch 34 is used in lieu of the pressure sensor 34. Control relay 51 is installed on a control board mounted within the housing which also includes the controller 30 and other electronics necessary for system operation and control. The controller 30 is preferably a microprocessor.

Power for the control board is provided through switch 26. Switch 26 is preferably a manual on/off switch. Switch 26 can be mounted to any convenient location on the housing 12 that is depicted in FIGS. 1 to 6. When switch 26 is off, no current flows and nothing in system 500 is electrically energized. In particular, solenoid valve 32 is deenergized, and fails to the closed or safe position.

Initially, no gas flows from fuel tank 56 to burners 62 because a manual valve on fuel tank 56 is closed and because the solenoid valve 32 is closed. Valve 32 is closed because it is a normally closed (NC) valve and will not open unless solenoid coil 32' is energized. Solenoid coil 32' is not energized because normally open (NO) relay contact 51B is open. 51B will not close unless relay coil 51 is energized. Relay coil 51 is not energized because neither one of the NO contacts 34A and 51A is closed. Contact 51A will not close unless relay coil 51 is energized. Contact 34A (the electrical contact of pressure switch 34) is a NO contact that will close only if pressure switch 34 closes. Pressure switch 34 is open because there is no pressure in the gas line between fuel tank 56 and solenoid valve 32.

When an operator turns switch 26 on, e.g. by manipulating a rocker or pushbutton, the controller is energized and the system is ready for operation. However, the system will not activate until pressurized gas is sensed at the gas inlet. When the operator opens the manual valve on the fuel tank 56, the gas line 57 between the fuel tank 56 and the solenoid valve 32 will pressurize, causing the pressure switch 34 to close its NO contact 34A. Closure of contact 34A energizes relay coil 51, which causes closure of relay contacts 51A, 51B, and 51C. Closure of contact 51B energizes the solenoid coil 32' to open the solenoid valve 32. Gas will now flow from the fuel tank 56 to the burners 62. When the gas flows, the pressure will drop, causing pressure switch contact 34A to re-open. However, contact 51A became closed before 34A could re-open, which keeps relay coil 51 energized and therefore the solenoid valve 32 remains open. Since contact 51C is now also closed, it energizes the timer 53. Timer 53 is set to a time delay (e.g. 60 seconds), and if energized for the full 60 seconds it will open the NC contact 53A, which is a latching relay configured to latch open until manually reset.

With the solenoid valve 32 open and the timer 53 energized, the operator now attempts to ignite the burners 62 using igniter 60. If the burners are lit, then the temperature sensor 18 will sense the heat and transmit a representative temperature signal to the controller. When the temperature signal exceeds a minimum setpoint, the controller will command the NC contact 18A to open and deenergize the timer 53. With the timer 53 de-energized, solenoid valve 32 will remain open indefinitely as long as the burners 62 emanate heat. TE 18 is shown in FIG. 11 in an embodiment in which TE 18 requires DC power to operate. In other embodiments, where TE 18 does not need DC power to operate (i.e. it is activated by heat alone) then TE 18 can be removed from the figure, though its functionality in this control scheme is otherwise unchanged.

In another operating scenario, with the solenoid valve 32 open and the timer 53 energized, the operator attempts to ignite the burners 62 but fails, e.g. due to a defective igniter, defective burners, or a leak in the gas line. In this case TE 18 does not heat up, which means that relay contact 18A remains closed allowing timer 53 to "time out" (e.g. after 15, 30 or 60 seconds), causing the NC contact 53A to latch open. When 53A latches open, relay coil 51 is deenergized, causing contacts 51A, 51B and 51C to reopen. When contact 51B reopens, the solenoid coil 32' deenergizes and the valve 32 closes, cutting off the gas supply. When 51C reopens, the timer 53 is deenergized and resets, but contact 53A remains latched open. Re-closure of solenoid valve 32 causes pressure switch 34 to again close its NO contact 34A; however, with contact 53A latched open, relay 51 cannot energize and so the solenoid valve 32 remains closed to cut off the gas supply.

In another embodiment, another latching contact can be added to illuminate an LED whenever TE 18 times out, to indicate that the system is in "safe-shutdown" and must be reset. To reset the system, the operator must manually toggle switch 26 from on to off and back to on, which returns contacts 53A and 53B to their closed states.

In another embodiment, contact 51C can be replaced by a mechanically operated valve position switch 48A that closes when solenoid valve 32 is open, and opens when solenoid valve 32 is closed. Operation of the system would otherwise remain unchanged—when control relay 51 is energized and causes solenoid valve 32 to open, contact 48A would close and thereby energize timer 53. If relay contact 18A closes (or remains closed) due to low burner temperature, timer 53 may eventually "time out" and cause contact 53A to latch open, leading to system shut-down.

In another operating scenario, the grill has been left burning and unattended, with the power switch on and manual valve open on the fuel tank 56. The grill will continue to operate safely with the burners ignited, until the gas supply is exhausted. Eventually the burners 62 will cool until low temperature causes the temperature sensor 18 to initiate shutdown and closure of valve 32, as described above. The system cannot be turned on again until manual switch 26 is toggled off (to unlatch 53A and close it) then toggled on again. To avoid wasting fuel in this scenario, in another embodiment of the invention the controller 30 may be programmed with instructions to override all other operating scenarios and automatically shut down the system when timer 53 reaches a preset or operator selectable continuous maximum operating time such as 60 minutes, 90 minutes, or two hours. In this case, when the maximum operating time is reached, the controller 30 may cause contact 53A to latch open and thereby shut down the system.

In another operating scenario, the operator is done grilling and wants to manually shut down the grill. The operator switches 26 to the "off" position which opens contact 26 and cuts off power to all the components. All contacts 51 open, and solenoid valve 32 closes because the solenoid coil 32' has been deenergized. The burners 62 go out because the gas is shut off. Timer 53 is reset but cannot count down due to loss of power to the controller. Contacts 44A and 53A close but have no effect because the circuit is deenergized. With solenoid valve 32 now closed, pressure switch 34 detects pressure from the gas tank 56 and contact 34A closes, but switch 26 is open so nothing happens because the system is deenergized.

In another operating scenario, the grill burners 62 are on and a loss of power occurs at the power supply (e.g., the batteries die, a circuit breaker trips, etc.). In this case, relay coil 51 deenergizes, causing solenoid coil 32' to deenergize and valve 32 to close, which cuts off the gas supply. Burners 62 go out, pressure switch 34 closes the contact 34A, but without power nothing happens and the system reverts to the safe shutdown condition. In this and all foregoing scenarios, the safety system of the invention prevents unburnt gas from undesirably accumulating within a volume inside or around the grill.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A safety system for a gas grill, comprising:
   a housing having a gas inlet, a gas outlet, and enclosing:
      a post,
      a tube fluidically connecting the gas inlet to the gas outlet,
      a controller having memory,
      a power source configured to provide power to the system,
      an internal sensor electrically coupled to the controller and configured to sense a flow rate of gas through the tube and communicate the flow rate to the controller, and
      a valve downstream from the internal sensor and electrically coupled to the controller, wherein the valve is configured to change state in response to a signal received from the controller; and
   an external sensor electrically coupled to the controller by a cable and configured to sense a temperature remote from the housing and communicate the sensed temperature to the controller, wherein the cable partially circumvolves the post to relieve strain exerted on the cable.

2. The safety system of claim 1, wherein the tube comprises a venturi tube.

3. The safety system of claim 2, wherein the internal sensor comprises one or more pressure transducers.

4. The safety system of claim 2, the internal sensor consisting of two pressure transducers positioned in the venturi tube and configured to sense an upstream pressure and a downstream pressure.

5. The safety system of claim 4, wherein the controller further comprises a first routine encoded in software and stored in the memory, the first routine configured to calculate the flow rate of the gas through the tube based on a pressure differential sensed from the upstream pressure signal and the downstream pressure signal, the controller configured to execute the first routine.

6. The safety system of claim 1, wherein the external sensor comprises an infrared temperature sensor.

7. The safety system of claim 1, wherein the housing comprises a cover removably attached to a housing base, wherein the post extends from the housing base and is configured to receive a fastener to secure the cover to the housing base.

8. The safety system of claim 1, wherein the valve comprises a solenoid valve.

9. The safety system of claim 1, wherein the valve is a normally closed valve.

10. The safety system of claim 9, wherein the housing further comprises a switch electrically coupled to the controller and operable between an on position and an off position, wherein when the switch is in the on position the controller energizes the valve to open and when the switch is in the off position the valve is deenergized.

11. The safety system of claim 1, wherein the controller is configured to execute a routine encoded in software and stored in the memory, the routine configured to change the state of the valve in response to input signals received from the internal sensor and the external sensor.

12. The safety system of claim 11, wherein the routine comprises the following steps:
   (a) sending a command to the valve to open;
   (b) receiving a first signal from the internal sensor indicating a positive flow rate or no flow through the tube;
   (c) receiving an initial signal from the external sensor;
   (d) maintaining the valve open for a preset period of time;
   (e) receiving an updated signal from the external sensor upon expiration of the preset period of time;
   (f) comparing the initial signal to the updated signal to obtain a temperature differential, and
   (g) if the temperature differential exceeds a preset threshold, then a signal is sent to maintain the valve open, and if the temperature differential does not exceed the preset threshold, then the valve is deenergized.

13. The safety system of claim 12, wherein the controller further comprises a means for a user to program the preset period of time.

14. The safety system of claim 12, wherein the routine further comprises the steps of:
   (h) receiving a continuous signal from the external sensor;
   (i) comparing the continuous signal to a preset temperature threshold, wherein if the continuous signal drops below the preset temperature threshold the controller commands the valve to close and wherein if the continuous signal exceeds the preset temperature threshold the controller commands the valve to maintain open;
   (j) maintaining the valve open in response to the continuous signal exceeding the preset temperature threshold;
   (k) repeating steps (h) through (j) until the current temperature signal drops below the preset temperature threshold; and
   (l) deenergizing the valve upon the continuous signal dropping below the preset temperature threshold.

15. The safety system of claim 14, wherein the controller further comprises a means for a user to program the preset temperature threshold.

16. The safety system of claim 11, wherein the routine comprises the steps of:
   (a) sending a command signal to the valve to open;
   (b) receiving a first signal from the internal sensor indicating a positive flow rate or no flow through the tube;
   (c) maintaining the valve open for a preset period of time;
   (d) receiving a second signal from the external sensor;
   (e) comparing the second signal to a preset threshold; and
   (f) if the second signal exceeds the preset threshold then the valve is maintained open and if the second signal does not exceed the preset threshold then the valve is deenergized.

17. The safety system of claim 16, wherein the routine further comprises the steps of:
   (g) repeating steps (d) through (f) until the second signal falls below the preset threshold;

(h) deenergizing the valve upon the second signal falling below the preset threshold.

18. An aftermarket safety device for a gas grill, comprising:
a cover removably attached to a base, the base having at least one post configured to receive a fastener to connect the base to the cover and a gas inlet fluidically connected to a gas outlet by a venturi tube, the base further comprising:
a controller having memory and electrically coupled to an external power source configured to provide power to the system,
two pressure transducers electrically coupled to the controller and configured to sense a pressure differential created across the venturi tube and communicate the sensed pressure differential to the controller, and
a normally closed solenoid valve electrically coupled to the controller and downstream from the venturi tube, wherein the solenoid valve is configured to change state in response to a signal received from the controller; and
an infrared temperature sensor electrically coupled to the controller by a cable and configured to sense a temperature remote from the housing and communicate the sensed temperature with the controller, wherein the cable partially circumvolves the post to relieve strain exerted on the cable.

19. A safety system for a gas grill, comprising:
a housing having a gas inlet, a gas outlet, and enclosing:
a post,
a tube fluidically connecting the gas inlet to the gas outlet,
a controller having memory,
a power source configured to provide power to the system, and
a valve electrically coupled to the controller, wherein the valve is configured to change state in response to a signal received from the controller; and
an external sensor electrically coupled to the controller by a cable and configured to sense a temperature remote from the housing and communicate the sensed temperature to the controller, wherein the cable partially circumvolves the post to relieve strain exerted on the cable.

20. The safety system of claim 19, wherein the controller is configured to execute a routine encoded in software and stored in the memory, the routine configured to change the state of the valve in response to input signals received from the external sensor, wherein the routine comprises the following steps:
(a) receive a power on signal and command the valve to open,
(b) receive a first temperature signal from the external sensor,
(c) maintain the valve open for a preset period of time,
(d) receive a second temperature signal from the external sensor,
(e) calculate a temperature change based on the first temperature signal and the second temperature signal,
(f) comparing the temperature change with a preset threshold, wherein if the temperature change is greater than the preset threshold then the valve is maintained open and wherein if the temperature change is less than the preset threshold then the valve is commanded to close.

* * * * *